United States Patent
Yabuguchi et al.

(10) Patent No.: US 8,310,187 B2
(45) Date of Patent: Nov. 13, 2012

(54) MOTOR DRIVE DEVICE

(75) Inventors: Michisada Yabuguchi, Kasugai (JP); Shinichi Kuratani, Kasugai (JP); Takenobu Nakamura, Kani (JP)

(73) Assignee: OMRON Corporation, Kyoto (JP)

( * ) Notice: Subject to any disclaimer, the term of this patent is extended or adjusted under 35 U.S.C. 154(b) by 360 days.

(21) Appl. No.: 12/714,062

(22) Filed: Feb. 26, 2010

(65) Prior Publication Data

US 2011/0080126 A1   Apr. 7, 2011

(30) Foreign Application Priority Data

Oct. 2, 2009   (JP) .................. 2009-230396

(51) Int. Cl.
*H02H 7/085* (2006.01)
*H02P 27/08* (2006.01)

(52) U.S. Cl. .................. 318/400.21; 318/434
(58) Field of Classification Search ............ 318/400.21, 318/400.22, 434, 478, 479, 504
See application file for complete search history.

(56) References Cited

U.S. PATENT DOCUMENTS

| | | | | |
|---|---|---|---|---|
| 4,624,334 A | * | 11/1986 | Kelledes et al. | 180/446 |
| 5,541,494 A | * | 7/1996 | Sannomiya et al. | 318/801 |
| 7,199,538 B2 | * | 4/2007 | Kameya | 318/400.05 |
| 7,791,293 B2 | * | 9/2010 | Nagase et al. | 318/400.01 |
| 8,008,881 B2 | * | 8/2011 | Ting | 318/434 |

FOREIGN PATENT DOCUMENTS

| | | |
|---|---|---|
| JP | 3812739 B2 | 6/2006 |
| JP | 2007-244133 A | 9/2007 |

* cited by examiner

*Primary Examiner* — Bentsu Ro
(74) *Attorney, Agent, or Firm* — Osha Liang LLP

(57) ABSTRACT

A motor drive device has a drive unit for driving a motor based on an ON/OF operation of a switching element by a PWM (Pulse Width Modulation) signal. The motor drive device uses a PWM control method and performs abnormal determination based on an application voltage value and an actual measurement voltage value of the motor. The motor drive device does not make a false determination of determining as abnormal when it is normal, when determining the presence of abnormality based on the application voltage value and the actual measurement voltage value of the motor.

6 Claims, 10 Drawing Sheets

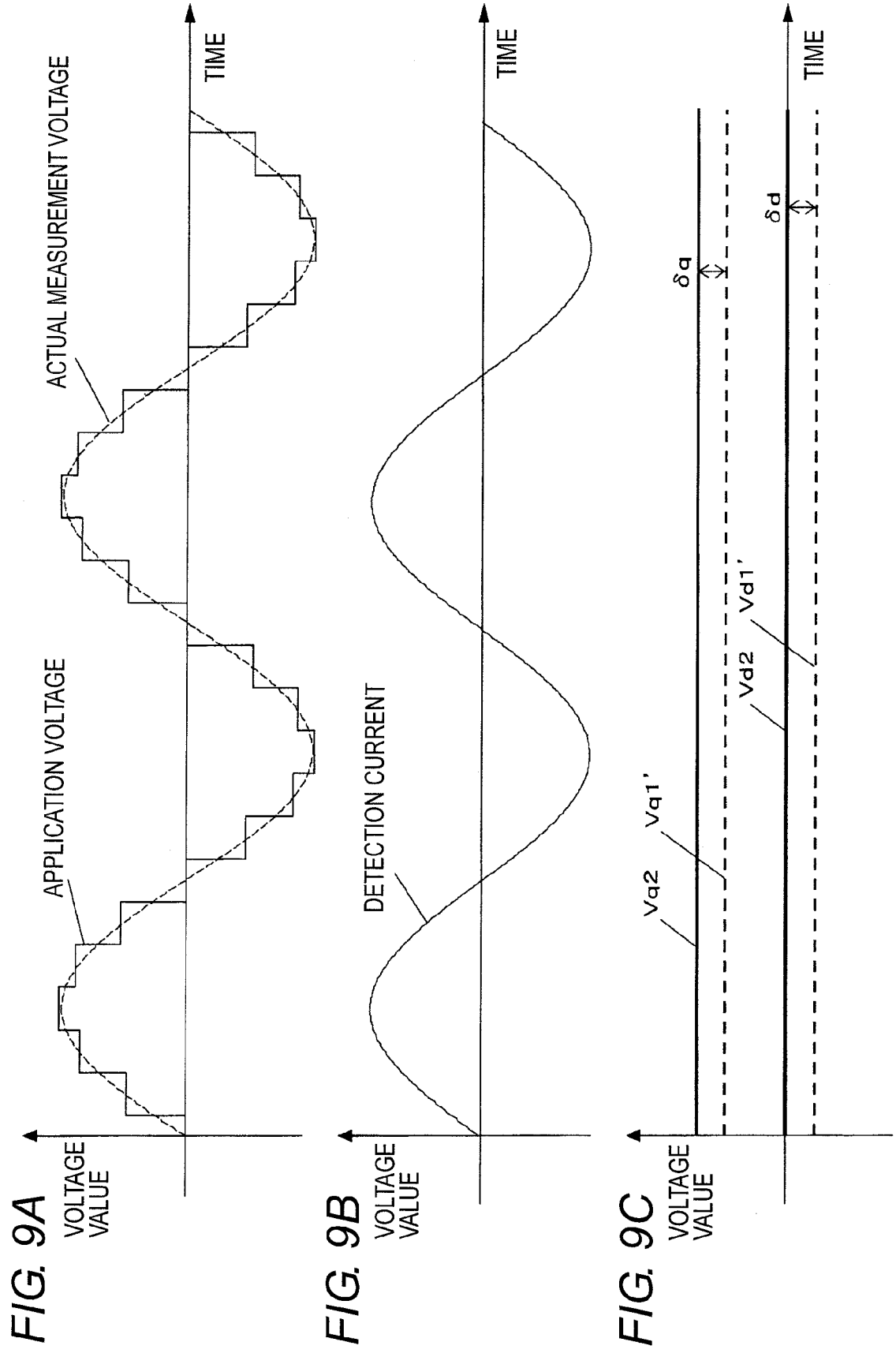

MOTOR DRIVE DEVICE

BACKGROUND OF THE INVENTION

1. Technical Field

The present invention relates to motor drive devices that use a PWM (Pulse Width Modulation) control method, and in particular, to a motor drive device for performing abnormal determination based on an application voltage value and an actual measurement voltage value of the motor.

2. Related Art

In an electric power steering device of a vehicle, an electric motor such as a three-phase brushless motor is arranged to provide a steering auxiliary force corresponding to steering torque of a handle to a steering mechanism. A motor drive device by the PWM control method is known as a device for driving the motor (e.g., Japanese Unexamined Patent Publication No. 2007-244133).

The motor drive device of the PWM control method includes an inverter circuit in which three pairs of upper and lower arms having a switching element on the upper arm and the lower arm are arranged. The inverter circuit receives a PWM signal for turning ON/OFF each of the switching elements. The PWM signal is generated based on a deviation of a current command value (target value) of a motor corresponding to steering torque detected by a torque sensor and an actual measurement value of the current actually flowing to the motor. The motor is driven by individually providing six types of PWM signals having a predetermined duty to six switching elements of the inverter circuit and turning ON/OFF each of the elements.

In such a motor drive device, the output torque of the motor becomes abnormal when failure occurs in the circuit or the motor, and the desired steering auxiliary force may not be obtained. Therefore, there has been proposed a motor drive device having a failure detection function of comparing the application voltage value and the actual measurement voltage value of the motor, and determining as abnormal if the difference is greater than or equal to a predetermined value (e.g., Japanese Patent No. 3812739).

SUMMARY

However, when performing the abnormal detection based on the difference between the application voltage value and the actual measurement voltage value of the motor, false determination of determining as abnormal when it is not actually abnormal may be made. The details are as follows.

In the motor drive device of the PWM control method, a signal having a step-shaped waveform corresponding to the application voltage of the motor is generated in an application voltage generation unit and is inputted to a PWM signal generation unit. The PWM signal generation unit generates a PWM signal based on such a signal, and outputs the same to the inverter circuit. The voltage supplied from the inverter circuit to the motor is a signal having a sin waveform, and such a signal is a signal taking an average value of the signal having a step-shaped waveform. The signal having the sin waveform is also detected by a current detector for detecting the current of the inverter circuit. In an abnormal determination unit, the application voltage value obtained by the application voltage generation unit and the actual measurement voltage value obtained through calculation from the current value detected by the current detector are compared, and presence of abnormality is determined depending on whether or not the difference thereof is greater than or equal to a constant value.

As shown in FIGS. 10A and 10B, the application voltage has a step-shaped waveform, and the actual measurement voltage has a sin waveform, and thus an error always exists between the application voltage value and the actual measurement voltage value even if the circuit is in a normal state. In particular, the error is greater when the cycle of the application voltage is short (rotation of the motor is fast), such as shown in FIG. 10A, as opposed to when the cycle is long (rotation of the motor is slow), such as shown in FIG. 10B. Therefore, the error may become greater than or equal to a threshold value and a false determination of determining as abnormal may be made although the state of the circuit is normal if the difference between the application voltage value and the actual measurement voltage value is simply compared with the threshold value. The threshold value may be set large as a countermeasure, but in such a case, the abnormality cannot be detected at high accuracy.

One or more embodiments of the present invention provides a motor drive device that does not make a false determination of determining as abnormal when it is normal, when determining the presence of abnormality based on the application voltage value and the actual measurement voltage value of the motor.

In accordance with one aspect of the present invention, there is provided a motor drive device including: a drive unit for driving a motor based on an ON/OFF operation of a switching element by a PWM (Pulse Width Modulation) signal; a current detection unit for detecting a current value of current flowing to the drive unit at a predetermined current detection timing, and obtaining an actual measurement current value of current flowing to each of phases of the motor; an application voltage generation unit for obtaining an application voltage value of the motor based on the actual measurement current value obtained by the current detection unit and a current command value indicating a target value of the current to be flowed to the motor inputted from outside; a PWM signal generation unit for generating the PWM signal and outputting to the drive unit based on the application voltage value obtained by the application voltage generation unit; and an abnormality detection unit for detecting abnormality from the application voltage value of each of the phases and the actual measurement current value of each of the phases; wherein the abnormality detection unit includes, an application voltage value storage portion for storing the application voltage value of each of the phases obtained by the application voltage generation unit for every current detection timing in the current detection unit, a corrected voltage value generation portion for obtaining a corrected voltage value, in which the application voltage value is corrected, based on the application voltage value stored in the application voltage value storage portion, a current detection cycle which is a time necessary from the current detection timing of the previous time to the current detection timing of this time in the current detection unit, and a time necessary until the voltage of the application voltage value obtained by the application voltage generation unit is applied to the motor from when the current detection is performed at a certain current detection timing, a current-voltage conversion portion for converting the actual measurement current value obtained by the current detection unit to the actual measurement voltage value, and an abnormality determination portion for determining abnormality by comparing the corrected voltage value obtained by the corrected voltage value generation portion and the actual measurement voltage value obtained by the current-voltage conversion portion.

BRIEF DESCRIPTION OF THE DRAWINGS

FIGS. 9A to 9C are diagrams describing when the application voltage value is not corrected.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
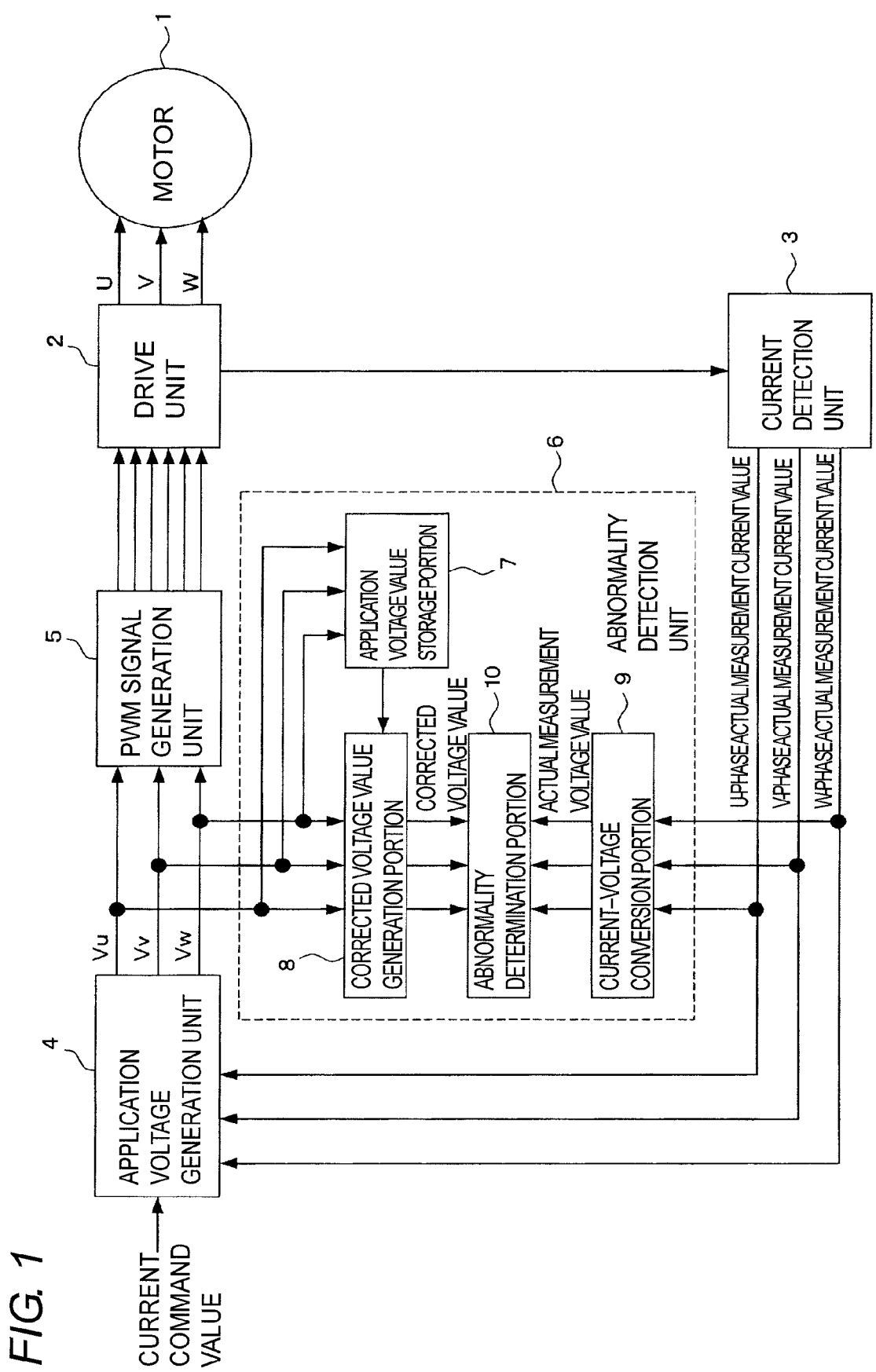
FIG. 1 is a block diagram showing an embodiment of the present invention.

As shown in FIG. 1, a motor drive device according to one or more embodiments of the present invention includes a drive unit 2 for driving a motor 1 based on an ON/OFF operation of a switching element (not shown) by a PWM signal, a current detection unit 3 for detecting a current value of current flowing to the drive unit 2 and obtaining an actual measurement current value of current flowing to each phase of the motor 1, an application voltage generation unit 4 for obtaining an application voltage value of the motor 1 based on the actual measurement current value obtained by the current detection unit 3 and a current command value, a PWM signal generation unit 5 for generating a PWM signal based on the application voltage value obtained by the application voltage generation unit 4, and outputting to the drive unit 2, and an abnormality detection unit 6 for detecting abnormality from the application voltage value of each phase and the actual measurement current value of each phase.

The abnormality detection unit 6 includes an application voltage value storage portion 7, a corrected voltage value generation portion 8, a current-voltage conversion portion 9, and an abnormality determination portion 10. The application voltage value storage portion 7 stores the application voltage value of each phase for every current detection timing in the current detection unit 3. The corrected voltage value generation portion 8 obtains a corrected voltage value (details on correction will be described later) in which the application voltage value is corrected based on the application voltage value stored in the application voltage value storage portion 7, the cycle of the current detection in the current detection unit 3, and the time required until the voltage is applied to the motor 1 from when the current detection is performed. The current-voltage conversion portion 9 converts the actual measurement current value obtained by the current detection unit 3 to the actual measurement voltage value. The abnormality determination portion 10 determines abnormality by comparing the corrected voltage value obtained by the corrected voltage value generation portion 8 and the actual measurement voltage value obtained by the current-voltage conversion portion 9.

With such a configuration, the application voltage value is corrected based on the current detection cycle and the time from the current detection to the voltage application in the corrected voltage value generation portion 8, and thus the error between the application voltage value after the correction (corrected voltage value) and the actual measurement voltage value becomes small. Thus, false determination of determining as abnormally when it is normal is not made and presence of abnormality can be correctly determined by comparing the actual measurement voltage value with the corrected voltage value in the abnormality determination portion 10. Furthermore, highly accurate abnormality detection can be performed since a correct determination can be made without setting the threshold value large.

Figure 2:
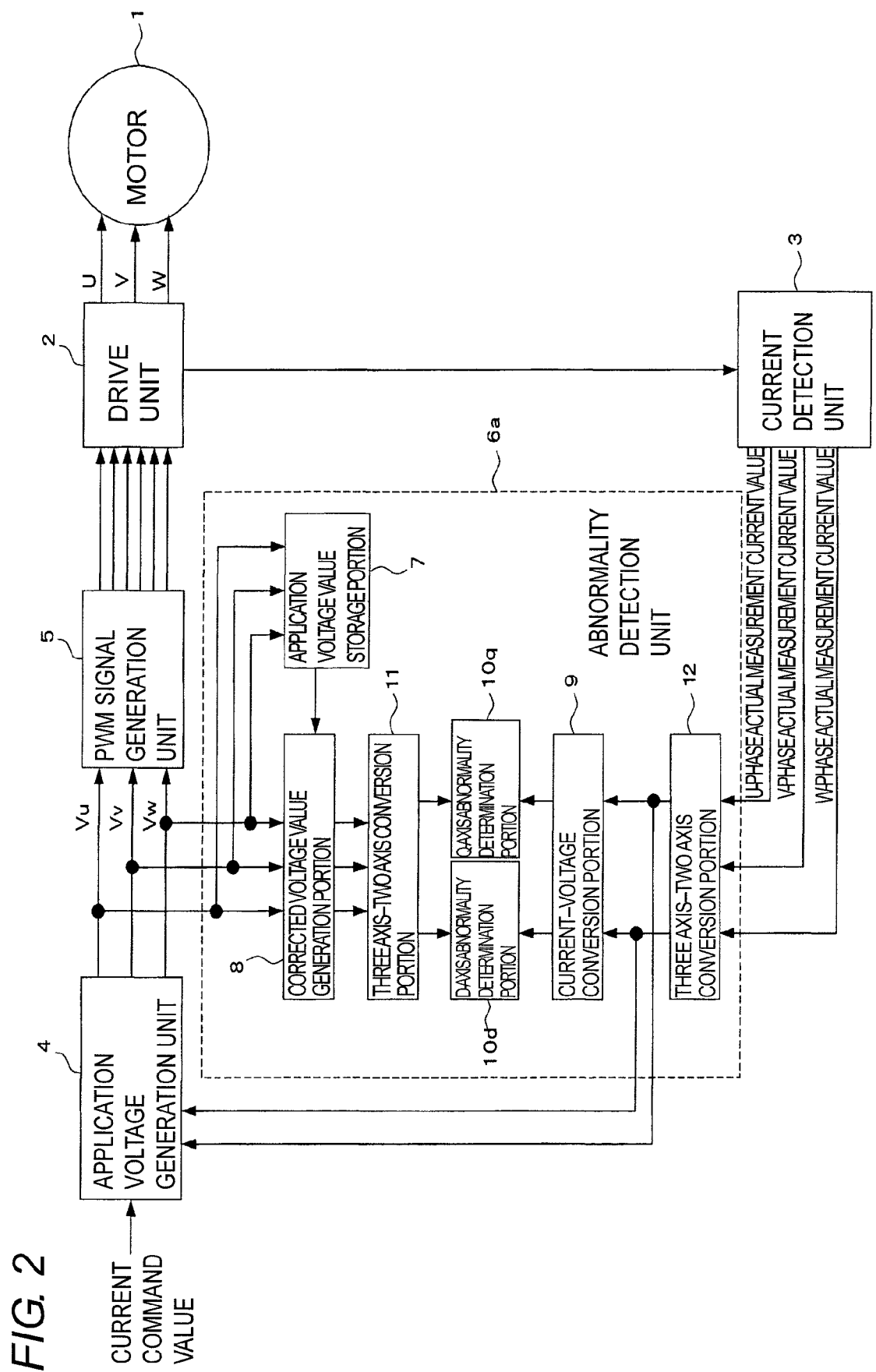
FIG. 2 is a block diagram showing another embodiment of the present invention.

In one or more embodiments of the present invention, a two-axis converted corrected voltage value and a two-axis converted actual measurement voltage value may be compared. In this case, the abnormality detection unit 6a includes a first three axis-two axis conversion portion 11 and a second three axis-two axis conversion portion 12, as shown in FIG. 2. The first three axis-two axis conversion portion 11 three axis-two axis converts the corrected voltage value of each phase obtained in the corrected voltage value generation portion 8, and obtains a d-axis corrected voltage value and a q-axis corrected voltage value. The second three axis-two axis conversion portion 12 three axis-two axis converts the actual measurement current value of each phase obtained in the current detection unit 3, and obtains a d-axis actual measurement current value and a q-axis actual measurement current value. The abnormality determination portion is also configured by a d-axis abnormality determination portion 10$d$ and a q-axis abnormality determination portion 10$q$. The d-axis abnormality determination portion 10$d$ determines abnormality by comparing the d-axis corrected voltage value obtained by the first three axis-two axis conversion portion 11, and the d-axis actual measurement voltage value obtained by the current-voltage conversion portion 9 based on the d-axis actual measurement current value obtained by the second three axis-two axis conversion portion 12. The q-axis abnormality determination portion 10$q$ determines abnormality by comparing the q-axis corrected voltage value obtained by the first three axis-two axis conversion portion 11, and the q-axis actual measurement voltage value obtained by the current-voltage conversion portion 9 based on the q-axis actual measurement current value obtained by the second three axis-two axis conversion portion 12.

This has an advantage in that the determination process in the abnormality determination portions 10$d$, 10$q$ can be simplified since the corrected voltage value and the actual measurement voltage value are three axis-two axis converted and become data having information on only the amplitude and the phase.

Figure 3:
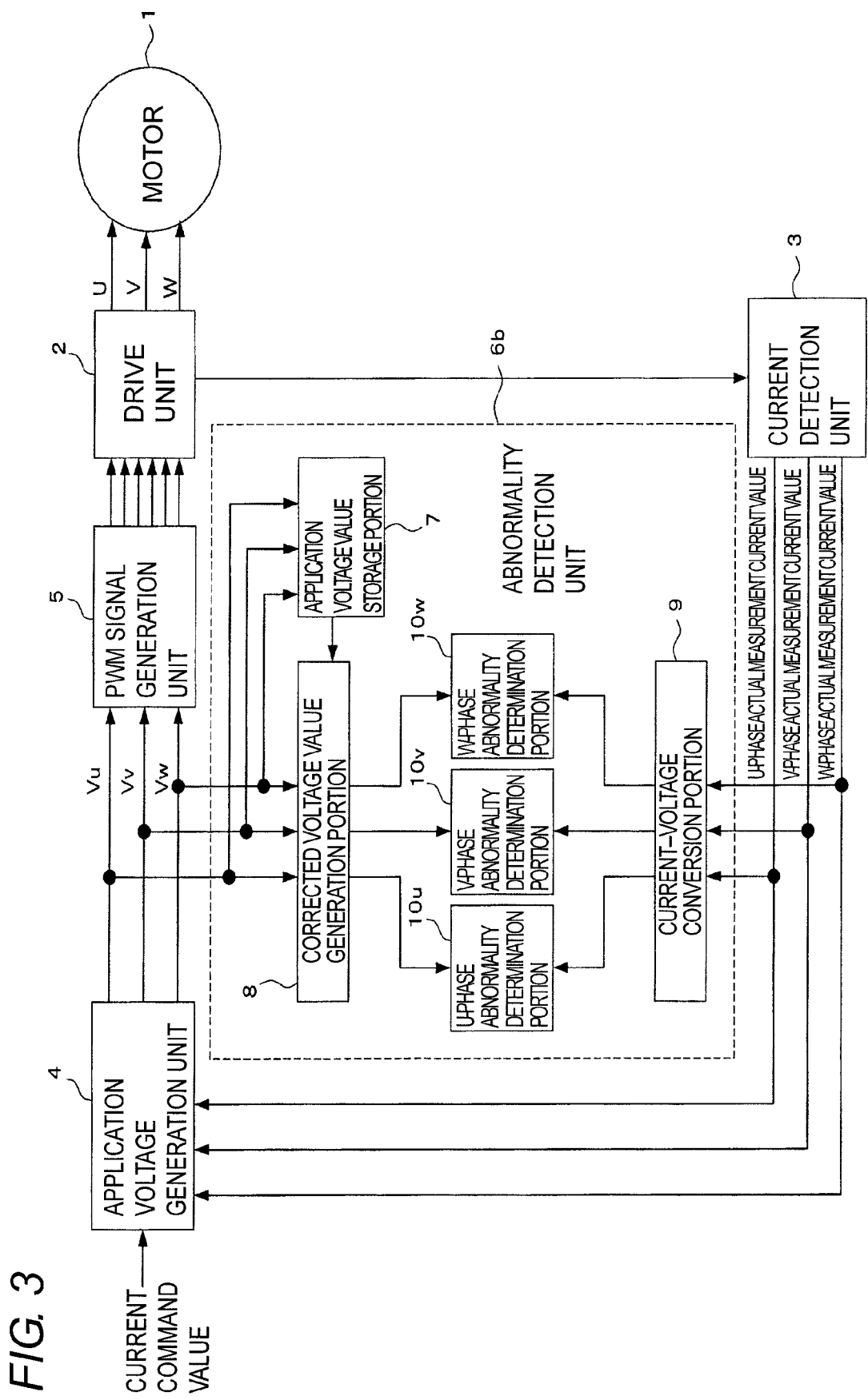
FIG. 3 is a block diagram showing still another embodiment of the present invention.

Furthermore, in one or more embodiments of the present invention, the corrected voltage value of each phase and the actual measurement voltage value of each phase may be directly compared without two-axis converting the corrected voltage value and the actual measurement voltage value. In this case, the abnormality determination portion is configured by a U-phase abnormality determination portion 10$u$, a V-phase abnormality determination portion 10$v$, and a W-phase abnormality determination portion 10$w$, as shown in FIG. 3. The U-phase abnormality determination portion 10$u$ determines abnormality of the U-phase by comparing the corrected voltage value of the U-phase obtained by the corrected voltage value generation portion 8, and the actual measurement voltage value of the U-phase obtained by the current-voltage conversion portion 9. The V-phase abnormality determination portion 10v determines abnormality of the V-phase by comparing the corrected voltage value of the V-phase obtained by the corrected voltage value generation portion 8, and the actual measurement voltage value of the V-phase obtained by the current-voltage conversion portion 9. The W-phase abnormality determination portion 10w determines abnormality of the W-phase by comparing the corrected voltage value of the W-phase obtained by the corrected voltage value generation portion 8, and the actual measurement voltage value of the W-phase obtained by the current-voltage conversion portion 9.

This has an advantage in that the entire configuration is simplified since the three axis-two axis conversion portion does not need to be arranged.

Example

Figure 4:
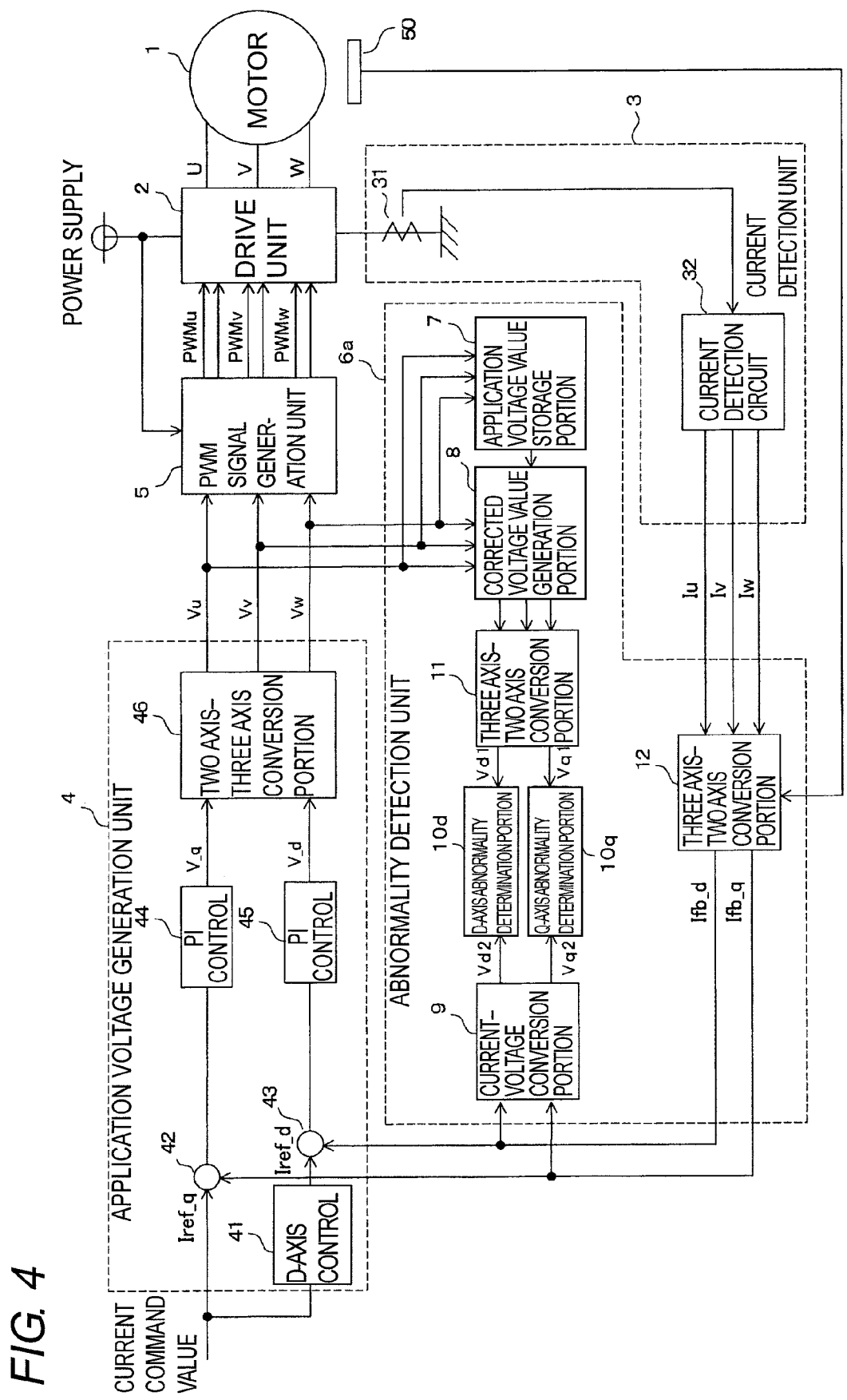
FIG. 4 is a diagram showing an example of a motor drive device according to one or more embodiments of the present invention.

FIG. 4 is a view showing an example of the motor drive device according to one or more embodiments of the present invention. FIG. 4 corresponds to FIG. 2, and more specifically shows the configuration of FIG. 2. Therefore, in FIG. 4, same reference numerals as FIG. 2 are denoted for the portions same as or corresponding to FIG. 2.

Figure 5:
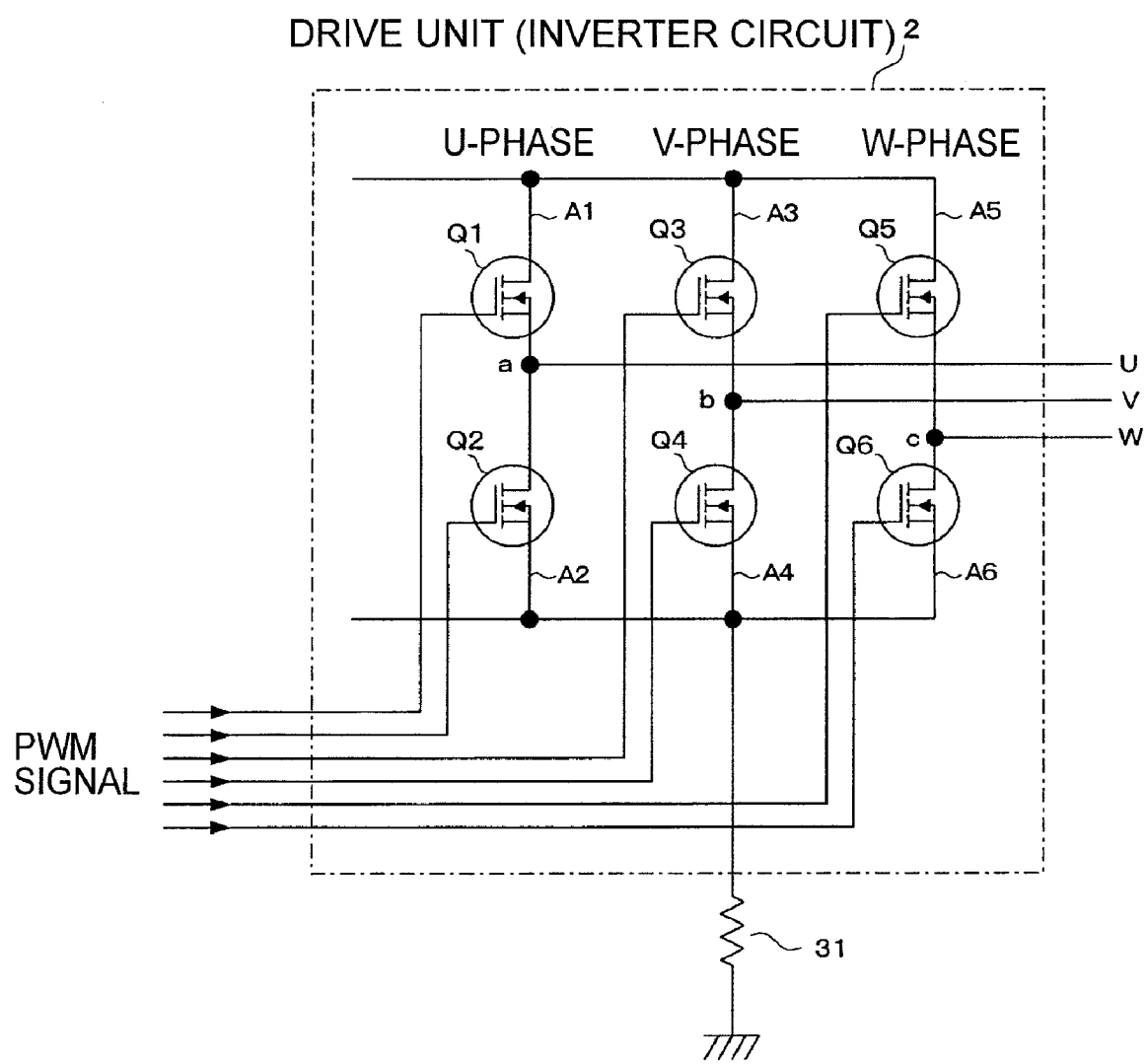
FIG. 5 is a circuit diagram showing one example of a drive unit (inverter circuit)

The motor 1 is a three-phase brushless motor used in an electric power steering device of a vehicle. The drive unit 2 for supplying the drive voltage to the motor 1 is configured by an inverter circuit. FIG. 5 is a circuit diagram showing one example of an inverter circuit configuring the drive unit 2. The inverter circuit is configured by a three-phase bridge in which three pairs of upper and lower arms are arranged in correspondence to the U-phase, the V-phase, and the W-phase. An upper arm A1 of the U-phase includes a switching element Q1, and a lower arm A2 of the U-phase includes a switching element Q2. An upper arm A3 of the V-phase includes a switching element Q3, and a lower arm A4 of the V-phase includes a switching element Q4. An upper arm A5 of the W-phase includes a switching element Q5, and a lower arm A6 of the W-phase includes a switching element Q6. The switching elements Q1 to Q6 are made of FET (Field Effect Transistor), for example.

The drive unit 2 receives six types of PWM signals (FIG. 5) for individually turning ON/OFF each of the switching elements Q1 to Q6 from the PWM signal generation unit 5, to be hereinafter described. The current flowing to the drive unit 2, that is, the current flowing to the motor 1 based on the ON/OFF of the switching elements Q1 to Q6 is detected by a current detection resistor 31. As shown in FIG. 4, the current detection resistor 31 configures the current detection unit 3 with the current detection circuit 32. The current detection circuit 32 obtains the actual measurement current values Iu, Iv, Iw of the current of each phase flowing to the motor 1 through calculation based on the voltage generated at both ends of the current detection resistor 31.

Actually, the currents of two phases of the currents of three phases are detected by the current detection resistor 31, and the actual measurement value of the current of the remaining one phase is obtained through calculation from the actual measurement values of the above currents. In this case, a relationship Iu+Iv+Iw=0 is satisfied among the actual measurement current values Iu, Iv, Iw of each phase, and thus the actual measurement current value Iv of the V-phase, for example, can be obtained from the following equation.

$$I = -(Iu+Iw)$$

The actual measurement current values Iu, Iv, Iw of each phase detected by the current detection unit 3 are converted to a d-axis actual measurement current value Ifb_d and a q-axis actual measurement current value Ifb_q in the three axis-two axis conversion portion 12. This conversion is carried out according to the following equation.

$$\begin{pmatrix} \text{Ifb\_d} \\ \text{Ifb\_q} \end{pmatrix} = \sqrt{\frac{2}{3}} \begin{pmatrix} \cos(\theta) & \cos\left(\theta - \frac{2}{3}\pi\right) & \cos\left(\theta + \frac{2}{3}\pi\right) \\ -\sin(\theta) & -\sin\left(\theta - \frac{2}{3}\pi\right) & -\sin\left(\theta + \frac{2}{3}\pi\right) \end{pmatrix} \begin{pmatrix} Iu \\ Iv \\ Iw \end{pmatrix}$$

Here, θ is an electric angle obtained based on the output of an angular sensor 50 for detecting a rotation position (rotation angle) of the motor 1 (same for the subsequent equations). The converted d-axis actual measurement current value Ifb_d and the q-axis actual measurement current value Ifb_q are provided to the application voltage generation unit 4, and also provided to the current-voltage conversion portion 9.

The application voltage generation unit 4 receives a current command value indicating the target value of the current to be flowed to the motor 1 from an external control unit (command unit) (not shown). The application voltage generation unit 4 generates the application voltage values (value of voltage to apply to the motor 1) Vu, Vv, Vw using the current command values and the information on the actual measurement current values detected by the current detection unit 3.

The application voltage generation unit 4 will be more specifically described. The application voltage generation unit 4 is configured by a D-axis control portion 41, calculators 42, 43, PI (Proportional Integral) control portions 44, 45, and a two axis-three axis conversion portion 46. The calculator 42 calculates the deviation between the q-axis current command value Iref_q corresponding to the steering torque detected by the torque sensor (not shown) and the q-axis actual measurement current value Ifb_q from the three axis-two axis conversion portion 12. The calculator 43 calculates the deviation between the d-axis current command value Iref_d in which the phase is adjusted by the D-axis control portion 41, and the d-axis actual measurement current value Ifb_d (actual measurement value) from the three axis-two axis conversion portion 12.

The deviation between the q-axis current command value Iref_q and the q-axis actual measurement current value Ifb_q, which is the output of the calculator 42, is provided to the PI control portion 44, and the q-axis voltage V_q corresponding to such a deviation is outputted from the PI control portion 44. The deviation between the d-axis current command value Iref_d and the d-axis actual measurement current value Ifb_d, which is the output of the calculator 43, is provided to the PI control portion 45, and the d-axis voltage V_d corresponding to such a deviation is outputted from the PI control portion 45.

The two axis-three axis conversion portion 46 converts the q-axis voltage V_q inputted from the PI control portion 44 and the d-axis voltage V_d inputted from the PI control portion 45 to a three-phase voltage by the two axis-three axis conversion. The application voltage values Vu, Vv, Vw of the three phases obtained by such a conversion are provided to the PWM signal generation unit 5, and to the abnormality detection unit 6a, to be described later. The two axis-three axis conversion in the two axis-three axis conversion portion 46 is carried out according to the following equation.

$$\begin{pmatrix} Vu \\ Vv \\ Vw \end{pmatrix} = \sqrt{\frac{2}{3}} \begin{pmatrix} 1 & 0 \\ -\frac{1}{2} & \frac{\sqrt{3}}{2} \\ -\frac{1}{2} & -\frac{\sqrt{3}}{2} \end{pmatrix} \begin{pmatrix} \cos(\theta) & -\sin(\theta) \\ \sin(\theta) & \cos(\theta) \end{pmatrix} \begin{pmatrix} V\_d \\ V\_q \end{pmatrix}$$

The PWM signal generation unit 5 generates a PWM signal of each phase having a predetermined duty for ON/OFF controlling the switching elements Q1 to Q6 (FIG. 5) of the drive unit 2 based on the application voltage values Vu, Vv, Vw, and outputs to the drive unit 2. In FIG. 4, each PWM signal of the switching elements Q1, Q2 of the U-phase is represented as PWMu, each PWM signal of the switching elements Q3, Q4 of the V-phase is represented as PWMv, and each PWM signal of the switching elements Q5, Q6 of the W-phase is represented as PWMw.

The drive unit 2 generates the drive voltage of the three phase by the ON/OFF operation of the switching elements Q1 to Q6 based on the PWM signal provided from the PWM signal generation unit 5, and outputs the same to the motor 1 to drive the motor 1.

In the abnormality detection unit 6a, the application voltage value storage portion 7 and the corrected voltage value generation portion 8 perform a correction process on the application voltage values Vu, Vv, Vw generated in the application voltage generation unit 4, and generates the corrected voltage value of each phase that is corrected. The details on the correction will be described later.

The corrected voltage value of each phase generated by the corrected voltage value generation portion 8 is provided to the three axis-two axis conversion portion 11, and converted to the corrected voltage values Vd1, Vq1 of two phases from the three phases (details are to be described later). The d-axis actual measurement current value Ifb_d and the q-axis actual measurement current value Ifb_q outputted from the three axis-two axis conversion portion 12 are converted to the d-axis actual measurement voltage value Vd2 and the q-axis actual measurement voltage value Vq2 in the current-voltage conversion portion 9 (details are to be described later). The d-axis abnormality determination portion 10d obtains a difference between the d-axis corrected voltage value Vd1 from the three axis-two axis conversion portion 11, and the d-axis actual measurement voltage value Vd2 from the current-voltage conversion portion 9, and determines as abnormal if the difference is greater than or equal to a threshold value set in advance, and determines as normal if smaller than the threshold value. The q-axis abnormality determination portion 10q obtains a difference between the q-axis corrected voltage value Vq1 from the three axis-two axis conversion portion 11, and the q-axis actual measurement voltage value Vq2 from the current-voltage conversion portion 9, and determines as abnormal if the difference is greater than or equal to a threshold value set in advance, and determines as normal if smaller than the threshold value.

Figure 6:
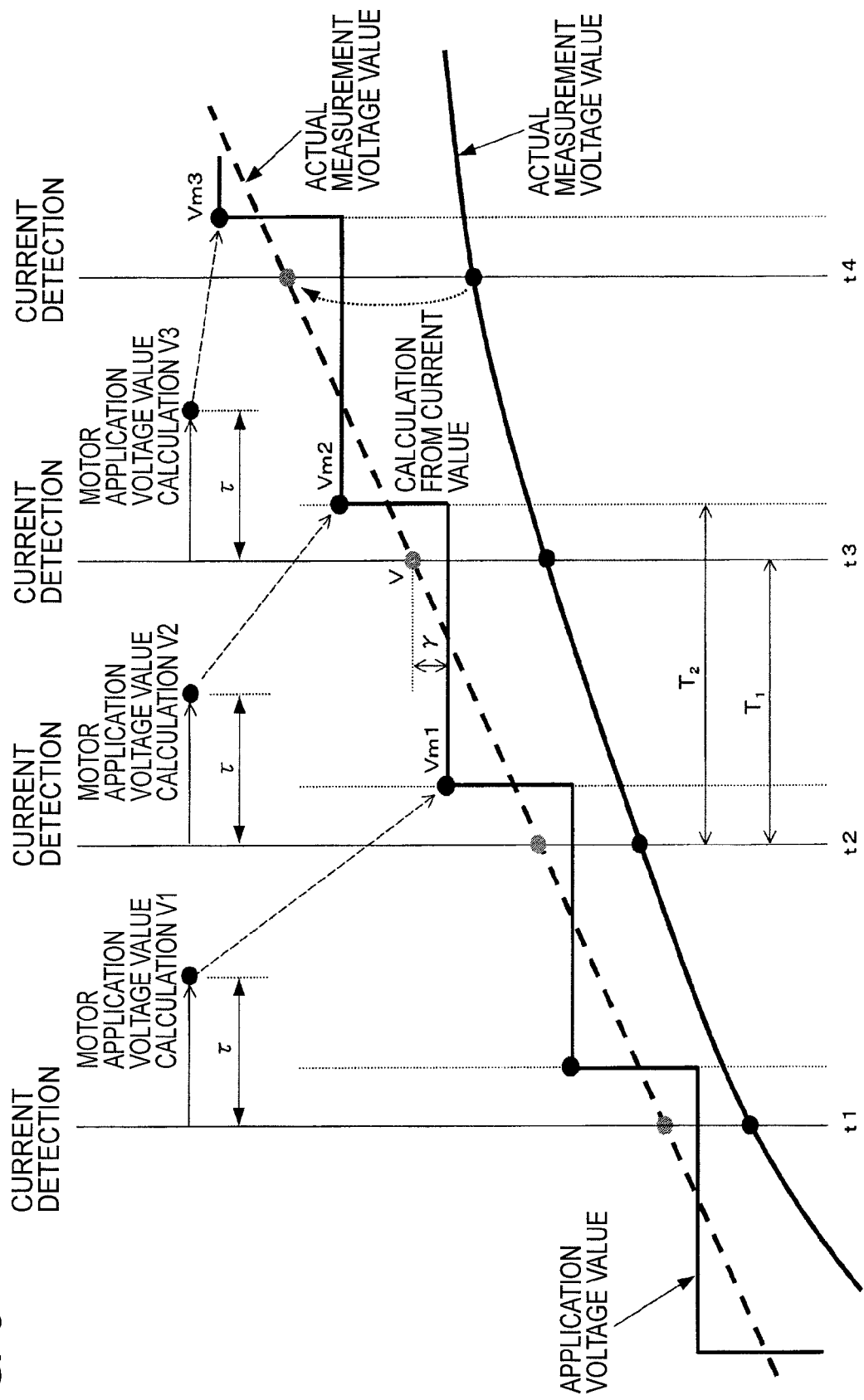
FIG. 6 is a diagram showing a state of current and voltage in a certain period of one phase.

The correction of the application voltage value will be described below. FIG. 6 is a view showing a state of current and voltage in a certain period of one phase of the three phases. The curve of the solid line represents the actual measurement current value (one of Iu, Iv, Iw of FIG. 4) of a certain phase detected by the current detection unit 3. The current detection is performed at every current detection timing t1, t2, t3, . . . , to be hereinafter described, and the current value at each timing (sampling point) is detected as a discrete value. The curve of the solid line of FIG. 6 connects the current values serving as points detected for every current detection timing, and is a continuous line. The curve of a broken line represents the actual measurement voltage value of a certain phase obtained through calculation from the actual measurement current value. That is, the curve of the broken line is obtained by current-voltage converting the current value represented by the curve of the solid line. The step-wise solid line represents the application voltage value (one of Vu, Vv, Vw of FIG. 4) of a certain phase provided from the application voltage generation unit 4 to the PWM signal generation unit 5.

Here, t1, t2, t3, . . . represent the timing at which the current is detected by the current detection unit 3. Here, τ represents the processing time required from when the current is detected at each timing t1, t2, t3, . . . until the application voltage generation unit 4 calculates the application voltage value. T1 is the time required from the current detection timing of the previous time to the current detection timing of this time, that is, the current detection cycle. T2 is the time from when the current is detected until the application voltage is actually applied to the motor.

When the current is detected at the timing t1, the application voltage value V1 is determined after the processing time τ, and the application voltage Vm1 (=V1) is actually applied to the motor delayed by a constant time from such a time point. Meanwhile, the current is newly detected at timing t2, and the application voltage value V2 is determined after the processing time τ. The application voltage Vm2 (=V2) is actually applied to the motor delayed by a constant time from such a time point. Similar operation is performed in the following timing.

As apparent from FIG. 6, the application voltage applied to the motor has a step-shaped waveform, whereas the actual measurement voltage (broken line) obtained from the actual measurement current of the motor has a continuous waveform. The waveform of the actual measurement voltage is obtained through calculation from the actual measurement current value (curve of solid line), and matches the sin waveform in which the step-shaped waveform of the application voltage is averaged. Looking only at the waveforms, the waveforms do not match, and thus an error exists between the application voltage value and the actual measurement voltage value. For instance, at timing t3, the actual measurement voltage value is V, the application voltage value is Vm1, and an error γ creates between the values. Therefore, if V and Vm1 are simply compared without correcting the application voltage value, false determination of determining as abnormal although the circuit state is normal may be made if the error γ is greater than or equal to the threshold value.

Figure 7:
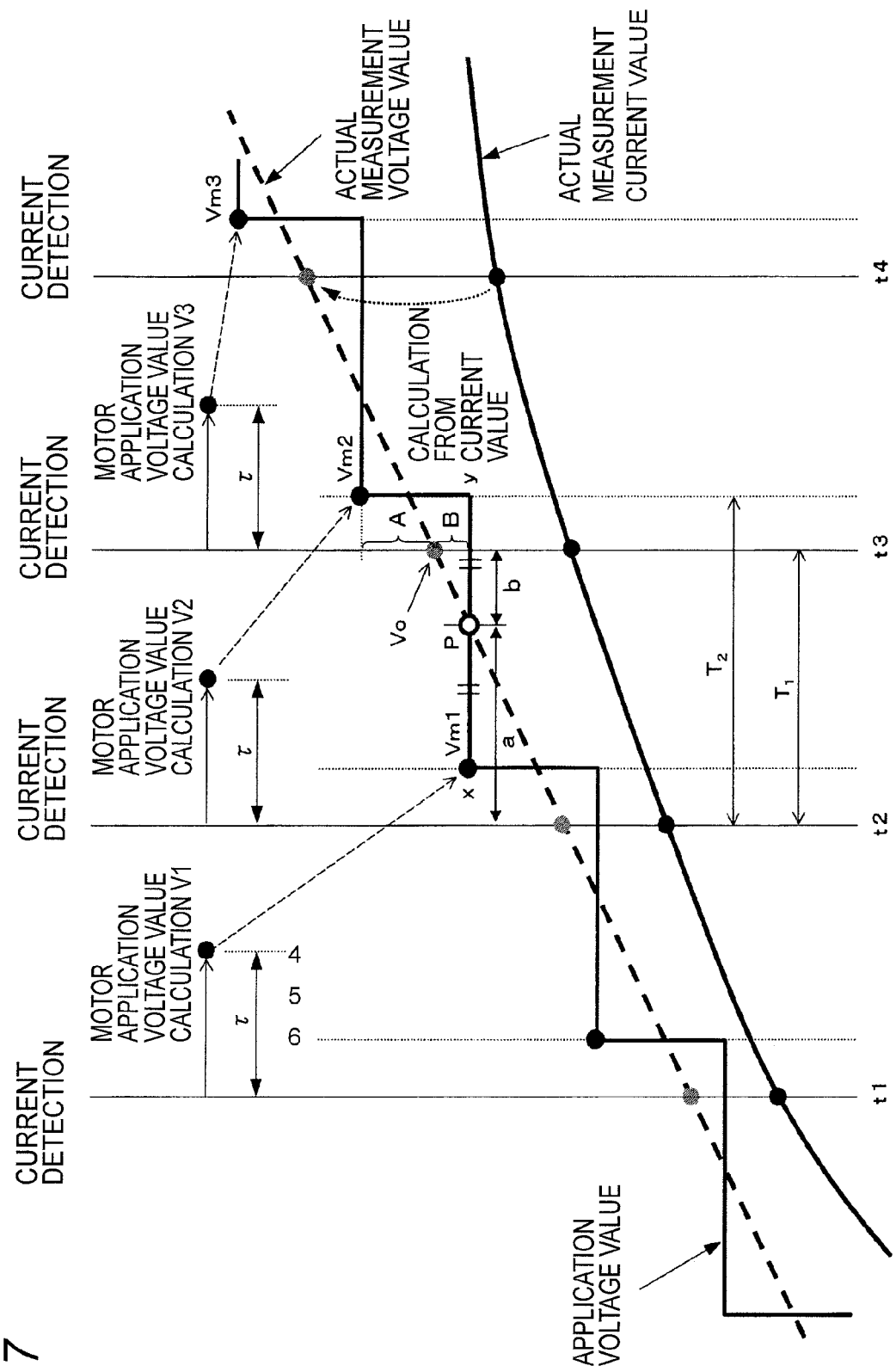
FIG. 7 is a diagram describing correction of an application voltage value.

Thus, in one or more embodiments of the present invention, the application voltage value is corrected to prevent such a false determination. The details will be described with reference to FIG. 7. Each waveform of FIG. 7 is the same as that of FIG. 6. The actual measurement voltage (broken line) has a sin waveform as described above, but can be approximated with a straight line in a short interval. The calculation thus can be simplified. In FIG. 7, P is an intersection of the actual measurement voltage waveform and the application voltage waveform, and is a midpoint of a line segment x-y. Assume that the distance (time) from timing t2 to the intersection P as a, and the distance (time) from the intersection P to the next timing t3 as b. Vo is the corrected voltage value assumed on a curve of the actual measurement voltage approximated to a straight line. The relationship A:B=a:b is satisfied, where B is the difference between the corrected voltage value Vo and the application voltage value Vm1 at timing t3, and A is the difference between the corrected voltage value Vo and the application voltage value Vm2. The corrected voltage value Vo can be calculated from the following equation.

$$Vo = \left(Vm1 \times \frac{a}{a+b} + Vm2 \times \frac{b}{a+b}\right) \div 2 \quad (1)$$

From FIG. 7, the following relationship is satisfied.

$$\left.\begin{array}{l} a+b = T_1 \\ a = T_2 - T_1/2 \\ b = T_1 - a = 3T_1/2 - T_2 \end{array}\right\} \quad (2)$$

T1 is a current detection cycle and is normally a constant value. If the current detection timing is not cyclic for some kind of reason, T1 is obtained by obtaining the time required from the current detection timing of the previous time to the current detection timing of this time. T2 is a time required from the current detection to the voltage application, and is a constant value. Therefore, in a normal case where T1 and T2 are both constant values, a/(a+b), b/(a+b) in equation (1) are constants. The corrected voltage value Vo can be represented as below from equation (1) and equation (2).

$$Vo = \left(Vm1 \times \frac{T_2 - T_1/2}{T_1} + Vm2 \times \frac{3T_1/2 - T_2}{T_1}\right) \div 2 \quad (3)$$

The corrected voltage value V0 geometrically obtained in the above manner is a voltage value assumed to be on the curve of the actual measurement voltage, as described above. Therefore, the corrected voltage value Vo is to match the actual measurement voltage value V (FIG. 6) obtained from the current detected by the current detection unit 3. Obtaining the difference between the actual measurement voltage value V and the corrected voltage value Vo by comparing the same, false determination of determining as abnormal when the device is normal can be avoided since the difference becomes substantially zero and does not become greater than or equal to the threshold value. When abnormality occurs in the device, the actual measurement voltage value V fluctuates thereby creating a difference with the corrected voltage value Vo, and hence such a difference becomes greater than or equal to the threshold value and abnormality can be detected.

In performing the calculation described above, the application voltage values V1 (Vm1), V2 (Vm2), V3 (Vm3), . . . calculated by the application voltage generation unit 4 are stored in the application voltage value storage portion 7 for every current detection timing t1, t2, t3, . . . in the current detection unit 3. If the current timing is t2, for example, the corrected voltage value generation portion 8 obtains the corrected voltage value Vo, in which the application voltage value is corrected, for each phase from equation (3) based on the application voltage value V2 (Vm2) generated by the application voltage generation unit 4 from the timing t2, the application voltage value V1 (Vm1) generated by the application voltage generation unit 4 from timing t1 one before and stored in the application voltage value storage portion 7, the current detection cycle T1, and the time T2 required until the voltage of V2 (Vm2) is applied to the motor from when the current is detected at timing t2.

The current detection cycle T1 and the time T2 required until the voltage is applied to the motor 1 from when the current is detected may be stored in the application voltage storage portion 7, or may be stored in a separately arranged storage portion. The current detection timing is not cyclic due to some kind of reason, the time of the current detection timing may be stored. In such a case, the time required from the current detection timing of the previous time to the current detection timing of this time may be obtained by the corrected voltage value generation portion 8. When storing the time of the current detection timing as well, the time may be stored in the application voltage storage portion 7 or may be stored in the separately arranged storage portion.

The corrected voltage value Vo of each phase obtained in such a manner is provided to the three axis-two axis conversion portion 11 of FIG. 4. The three axis-two axis conversion portion 11 converts the corrected voltage value of three phases to the corrected voltage value of two phases through the calculation process of the following equation.

$$\begin{pmatrix} Vd1 \\ Vq1 \end{pmatrix} = \sqrt{\frac{2}{3}} \begin{pmatrix} \cos(\theta) & \cos\left(\theta - \frac{2}{3}\pi\right) & \cos\left(\theta + \frac{2}{3}\pi\right) \\ -\sin(\theta) & -\sin\left(\theta - \frac{2}{3}\pi\right) & -\sin\left(\theta + \frac{2}{3}\pi\right) \end{pmatrix} \begin{pmatrix} Vo[u] \\ Vo[v] \\ Vo[w] \end{pmatrix} \quad (4)$$

Here, Vd1 is the d-axis corrected voltage value, Vq1 is the q-axis corrected voltage value, Vo[u] is the U-phase corrected voltage value, Vo[v] is the V-phase corrected voltage value, and Vo[w] is the W-phase corrected voltage value. The signals of the d-axis corrected voltage value Vd1 and the q-axis corrected voltage value Vq1 are both DC voltages.

The current-voltage conversion portion 9 converts the d-axis actual measurement current value Ifb_d and the q-axis actual measurement current value Ifb_q provided from the three axis-two axis conversion portion 12 to the d-axis actual measurement voltage value Vd2 and the q-axis actual measurement voltage value Vq2 through the calculation process of the following equation. The signals of the d-axis actual measurement voltage value Vd2 and the q-axis actual measurement voltage value Vq2 are also DC voltages.

$$Vd2 = \left(R + \frac{di}{dt}Ld\right)\text{Ifb\_d} - \omega \cdot Lq \cdot \text{Ifb\_q} \quad (5)$$

$$Vq2 = \omega \cdot Ld \cdot \text{Ifb\_d} + \left(R + \frac{di}{dt}Lq\right)\text{Ifb\_q} + \omega \cdot Ke$$

Here, R is the motor resistance [Ω], Ld is the d-axis inductance [H], Lq is the q-axis inductance [H], ω is the motor electric angular velocity [rad/s], and Ke is an induced voltage constant [V/(rad/s)].

The d-axis corrected voltage value Vd1 obtained by the three axis-two axis conversion portion 11 and the d-axis actual measurement voltage value Vd2 obtained by the current-voltage conversion portion 9 are inputted to the d-axis abnormality determination portion 10d. The d-axis abnormality determination portion 10d calculates the difference between the d-axis corrected voltage value Vd1 and the d-axis actual measurement voltage value Vd2, as described above, and determines as abnormal if the difference is greater than or equal to the threshold value and determines as normal if the difference is smaller than the threshold value.

The q-axis corrected voltage value Vq1 obtained by the three axis-two axis conversion portion 11 and the q-axis actual measurement voltage value Vq2 obtained by the current-voltage conversion portion 9 are inputted to the q-axis abnormality determination portion 10q. The q-axis abnormality determination portion 10q calculates the difference between the q-axis corrected voltage value Vq1 and the q-axis actual measurement voltage value Vq2, as described above, and determines as abnormal if the difference is greater than or equal to the threshold value and determines as normal if the difference is smaller than the threshold value.

Figure 8A:
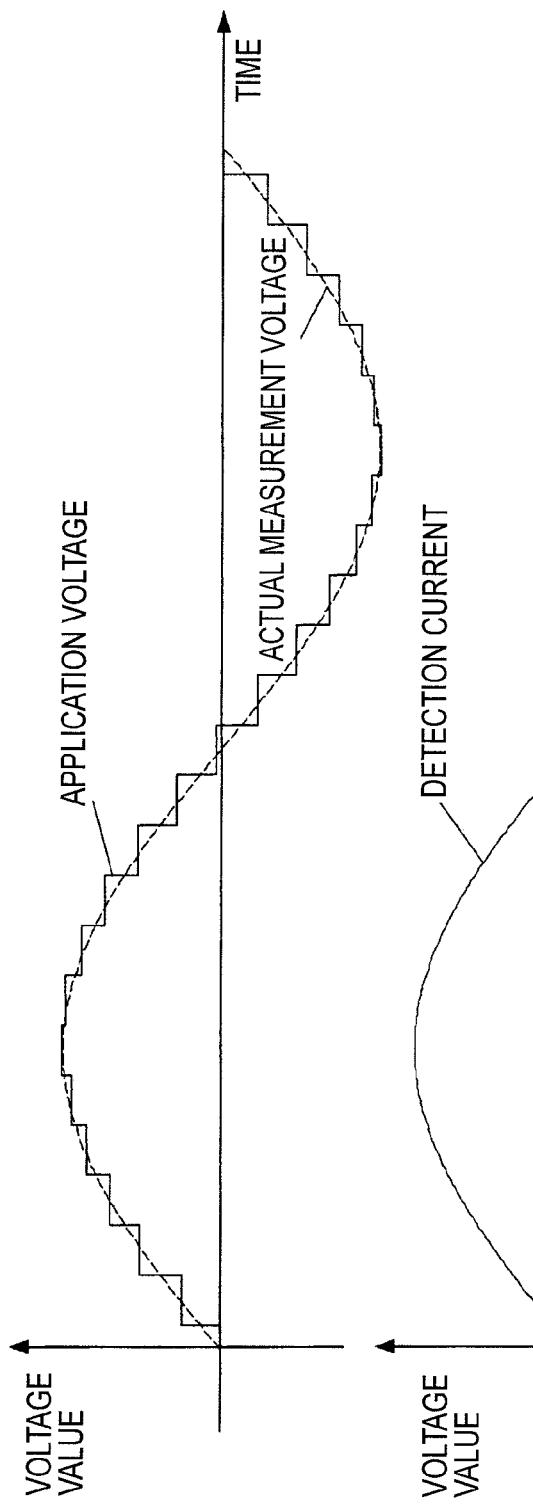
FIGS. 8A to 8C are diagrams describing when the application voltage value is not corrected.
Figure 8B:
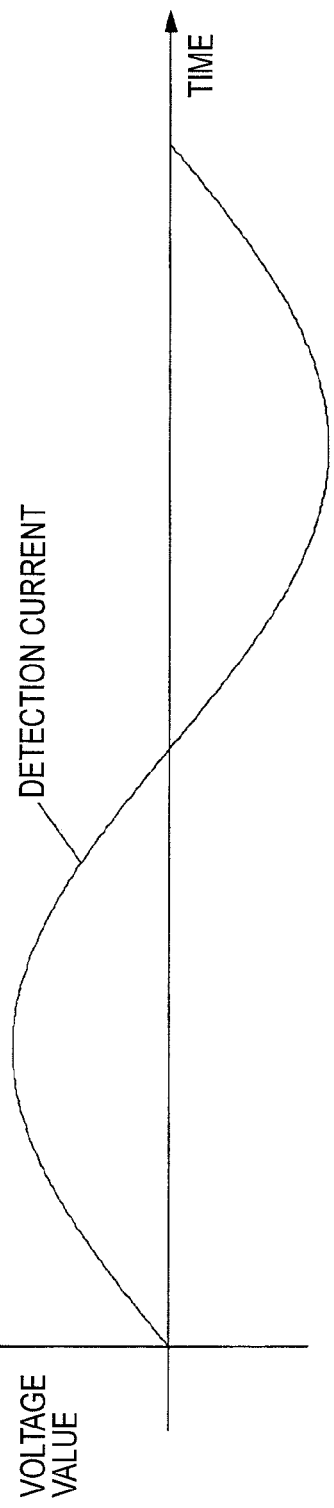
Figure 8C:
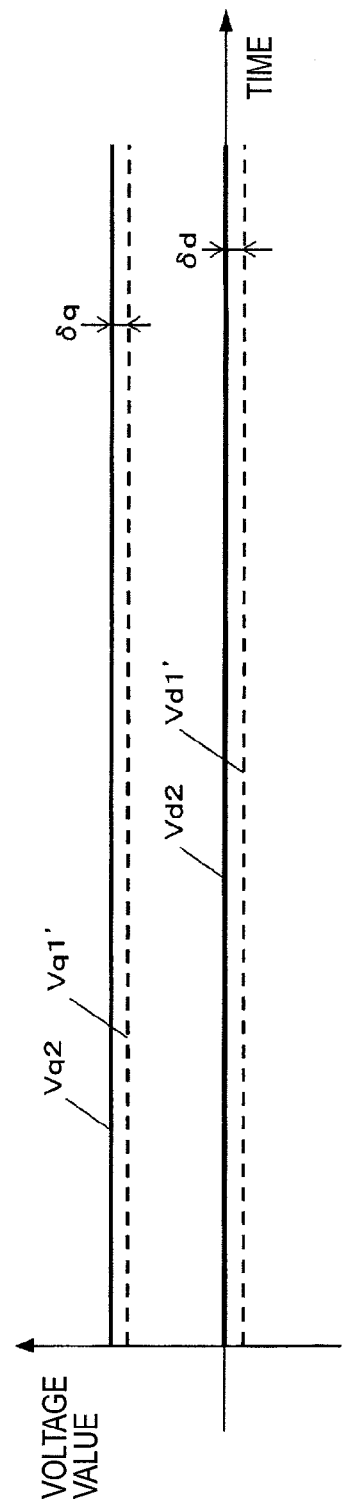
Figure 10A:
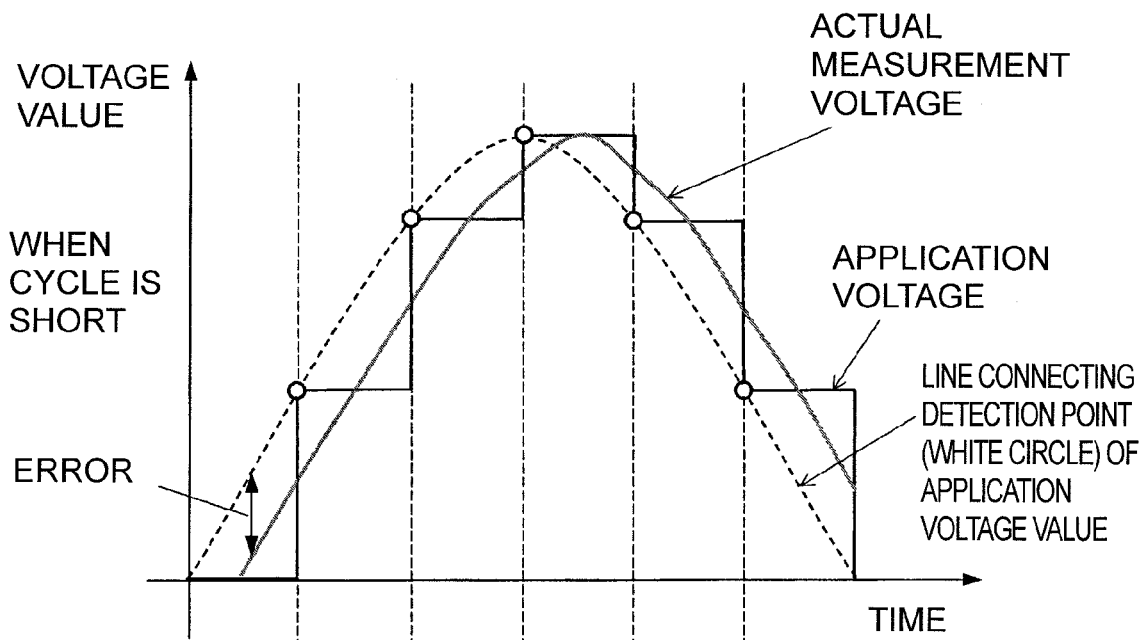
FIGS. 10A and 10B are diagrams describing an error between the application voltage value and an actual measurement voltage value.
Figure 10B:
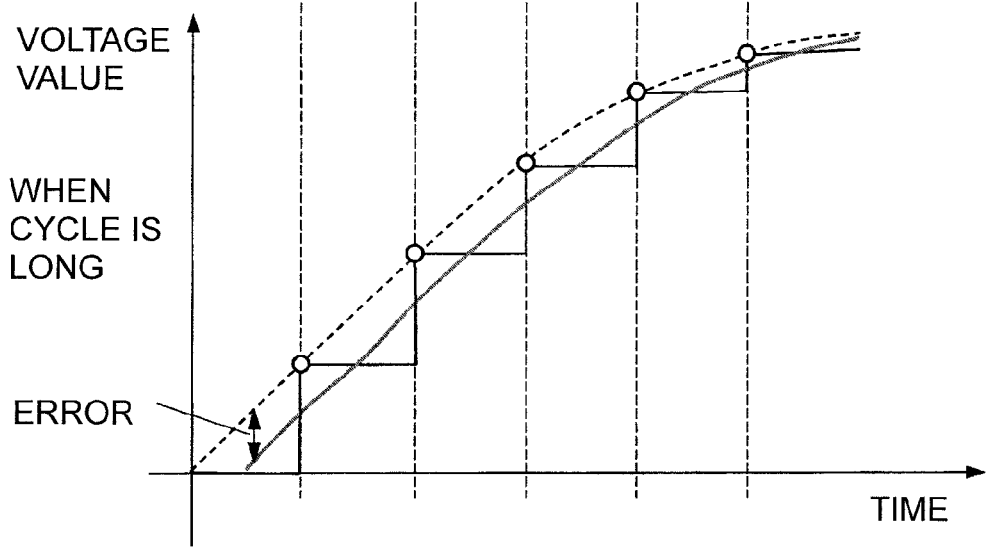

An error caused by the difference in waveform exists between the application voltage value and the actual measurement voltage value, as described above. Thus, if the application voltage values Vu, Vv, Vw are two axis converted by the three axis-two axis conversion portion 11 without being corrected, an error δd occurs between the d-axis application voltage value Vd1' and the d-axis actual measurement voltage value Vd2, as shown in FIG. 8C. The d-axis application voltage value Vd1' is based on the application voltage value (solid line) of FIG. 8A, and the d-axis actual measurement voltage value Vd2 is based on the actual measurement voltage value (broken line) of FIG. 8A calculated from the detection current value of FIG. 8B. As previously described, the error δd becomes larger the shorter the cycle of the application voltage (rotation of the motor becomes faster), as shown in FIG. 9C.

Similarly, an error δq occurs between the q-axis application voltage value Vq1' and the q-axis actual measurement voltage value Vq2. The q-axis application voltage value Vq1' is based on the application voltage value (solid line) of FIG. 8A, and the q-axis actual measurement voltage value Vq2 is based on the actual measurement voltage value (broken line) of FIG. 8A calculated from the detection current value of FIG. 8B. The error δd becomes larger the shorter the cycle of the application voltage (rotation of the motor becomes faster), as shown in FIG. 9C.

Therefore, if the application voltage values Vu, Vv, Vw are not corrected, the d-axis abnormality determination portion 10d falsely determines as abnormal if the difference δd between the d-axis application voltage value Vd1' and the d-axis actual measurement voltage value Vd2 exceeds a threshold value. Similarly, the q-axis abnormality determination portion 10q falsely determines as abnormal if the difference δq between the q-axis application voltage value Vq1' and the q-axis actual measurement voltage value Vq2 exceeds a threshold value.

In the case of the present example, on the other hand, the corrected voltage value Vo, in which the application voltage value of each phase is corrected, is calculated by equation (3) and the three axis-two axis conversion of equation (4) is performed using the corrected voltage value Vo to obtain the d-axis corrected voltage value Vd1 and the q-axis corrected voltage value Vq1. In the d-axis abnormality determination portion 10d, the d-axis corrected voltage value Vd1 and the d-axis actual measurement voltage value Vd2 are compared, where the difference is substantially zero in the normal state and thus false determination of determining as abnormal when the difference exceeds the threshold value does not occur. Similarly, in the q-axis abnormality determination portion 10q, the q-axis corrected voltage value Vq1 and the q-axis actual measurement voltage value Vq2 are compared, where the difference is substantially zero in the normal state and thus false determination of determining as abnormal when the difference exceeds the threshold value does not occur.

Therefore, according to the present example, the application voltage value is corrected as shown in equation (3) based on the current detection cycle T1 and the time T2 from the current detection to the voltage application in the corrected voltage value generation portion 8, and thus the error between the corrected voltage value and the actual measurement voltage value becomes small. Thus, false determination of determining as abnormal when it is normal does not occur by comparing the actual measurement voltage value and the corrected voltage value, and the presence of abnormality can be accurately determined. Furthermore, highly accurate abnormality detection can be performed since a correct determination can be made without setting the threshold value large.

In the present example, the two axis converted corrected voltage values Vd1, Vq1 and the two axis converted actual measurement voltage values Vd2, Vq2 are compared. Thus, the respective voltage values become data having information only on the amplitude and the phase, and the determination process in the d-axis abnormality determination portion 10d and the q-axis abnormality determination portion 10q can be simplified.

In one or more embodiments of the present invention, various examples other than the above can be adopted. For instance, in the above example, the voltages two axis converted in the d-axis abnormality determination portion 10d and the q-axis abnormality determination portion 10q are compared, but the abnormality determination portion may be configured by the U-phase abnormality determination portion 10u, the V-phase abnormality determination portion 10v, and the W-phase abnormality determination portion 10w as shown in FIG. 3, and the corrected voltage value of each phase and the actual measurement voltage value of each phase may be directly compared.

In the above example, the application voltage value V2 (Vm2) at the current timing t2 is acquired from the application voltage generation unit 4, and the application voltage value V1 (Vm1) at the timing t1 one before is acquired from the application voltage value storage portion 7 storing the same in obtaining the corrected voltage value Vo from equation (3). However, the present invention is not limited thereto, and the application voltage value at each timing may be sequentially stored in the application voltage value storage portion 7, and the corrected voltage value Vo may be obtained by acquiring the application voltage value at two adjacent timing from the application voltage value storage portion 7.

In the above example, the FET is used for the switching elements Q1 to Q6, but other switching elements such as IGBT (Insulated Gate Bipolar mode Transistor) may be used.

In the above example, a three-phase motor has been described as the motor 1, by way of example, but one or more embodiments of the present invention can also be applied to a case of driving a multi-phase motor of four or more phases.

Furthermore, in the above example, a brushless motor has been described as the motor 1, by way of example, but one or more embodiments of the present invention can also be applied to a device for driving a motor other than the brushless motor.

In one or more embodiments of the present invention, the application voltage value of each phase calculated for every current detection timing of the motor is stored, and a corrected voltage value, in which the application voltage value is corrected, is obtained based on such application voltage value, the current detection period of the motor, and the time necessary until the voltage is applied to the motor from when the current is detected. The determination on abnormality is carried out by comparing the corrected voltage value and the actual measurement voltage value obtained from the actual measurement current value of the motor current.

As a result, the application voltage value is corrected and the error with the actual measurement voltage value becomes small, and hence a false determination of determining as abnormal when it is normal does not occur and the presence of abnormality can be accurately determined. Furthermore, highly accurate abnormal detection can be performed since an accurate determination can be made without setting the threshold value large.

According to one or more embodiments of the present invention, the false determination of determining as abnormal can be prevented when detecting the abnormality of the motor drive device, and highly accurate abnormal detection can be made.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A motor drive device comprising:
    a drive unit for driving a motor based on an ON/OF operation of a switching element by a PWM (Pulse Width Modulation) signal;
    a current detection unit for detecting a current value of current flowing to the drive unit at a predetermined current detection timing, and obtaining an actual measurement current value of current flowing to each of phases of the motor;
    an application voltage generation unit for obtaining an application voltage value of the motor based on the actual measurement current value obtained by the current detection unit and a current command value indicating a target value of the current to be flowed to the motor inputted from outside;
    a PWM signal generation unit for generating the PWM signal and outputting to the drive unit based on the application voltage value obtained by the application voltage generation unit; and
    an abnormality detection unit for detecting abnormality from the application voltage value of each of the phases and the actual measurement current value of each of the phases;
    wherein the abnormality detection unit includes:
        an application voltage value storage portion for storing the application voltage value of each of the phases obtained by the application voltage generation unit for every current detection timing in the current detection unit,
        a corrected voltage value generation portion for obtaining a corrected voltage value, in which the application voltage value is corrected, based on the application voltage value stored in the application voltage value storage portion, a current detection cycle which is a time necessary from the current detection timing of the previous time to the current detection timing of this time in the current detection unit, and a time necessary until the voltage of the application voltage value obtained by the application voltage generation unit is applied to the motor from when the current detection is performed at a certain current detection timing,
        a current-voltage conversion portion for converting the actual measurement current value obtained by the current detection unit to the actual measurement voltage value, and
        an abnormality determination portion for determining abnormality by comparing the corrected voltage value obtained by the corrected voltage value generation portion and the actual measurement voltage value obtained by the current-voltage conversion portion.

2. The motor drive device according to claim 1, wherein the abnormality detection unit further includes:
    a first three axis-two axis conversion portion for three axis-two axis converting the corrected voltage value of each of the phases obtained by the corrected voltage value generation portion and obtaining a d-axis corrected voltage value and a q-axis corrected voltage value,
    a second three axis-two axis conversion portion for three axis-two axis converting the actual measurement current value of each of the phases obtained by the current detection unit, and obtaining a d-axis actual measurement current value and a q-axis actual measurement current value; and
the abnormality determination portion includes:
    a d-axis abnormality determination portion for determining abnormality by comparing the d-axis corrected voltage value obtained by the first three axis-two axis conversion portion and the d-axis actual measurement voltage value obtained by the current-voltage conversion portion based on the d-axis actual measurement current value obtained by the second three axis-two axis conversion portion, and
    a q-axis abnormality determination portion for determining abnormality by comparing the q-axis corrected voltage value obtained by the first three axis-two axis conversion portion and the q-axis actual measurement voltage value obtained by the current-voltage conversion portion based on the q-axis actual measurement current value obtained by the second three axis-two axis conversion portion.

3. The motor drive device according to claim 2, wherein the corrected voltage value generation portion calculates the corrected voltage value Vo with the following equation:

$$Vo = \left( Vm1 \times \frac{T_2 - T_1/2}{T_1} + Vm2 \times \frac{3T_1/2 - T_2}{T_1} \right) \div 2$$

where Vm2 is the application voltage value generated by the application voltage generation unit from a certain current detection timing, Vm1 is the application voltage value generated by the application voltage generation unit and stored in the application voltage value storage portion from the current detection timing one before the timing, T1 is the current detection cycle in the current detection unit, and T2 is the time necessary until the voltage of the application voltage value Vm2 is applied to the motor from when the current detection is performed at the certain current detection timing.

4. The motor drive device according to claim 1, wherein the abnormality determination portion includes:
    a U-phase abnormality determination portion for determining abnormality of the U-phase by comparing the corrected voltage value of the U-phase obtained by the corrected voltage value generation portion and the actual measurement voltage value of the U-phase obtained by the current-voltage conversion portion,
    a V-phase abnormality determination portion for determining abnormality of the V-phase by comparing the corrected voltage value of the V-phase obtained by the corrected voltage value generation portion and the actual measurement voltage value of the V-phase obtained by the current-voltage conversion portion, and a W-phase abnormality determination portion for determining abnormality of the W-phase by comparing the corrected voltage value of the W-phase obtained by the corrected voltage value generation portion and the actual measurement voltage value of the W-phase obtained by the current-voltage conversion portion.

5. The motor drive device according to claim 4, wherein the corrected voltage value generation portion calculates the corrected voltage value Vo with the following equation:

$$Vo = \left(Vm1 \times \frac{T_2 - T_1/2}{T_1} + Vm2 \times \frac{3T_1/2 - T_2}{T_1}\right) \div 2$$

where Vm2 is the application voltage value generated by the application voltage generation unit from a certain current detection timing, Vm1 is the application voltage value generated by the application voltage generation unit and stored in the application voltage value storage portion from the current detection timing one before the timing, T1 is the current detection cycle in the current detection unit, and T2 is the time necessary until the voltage of the application voltage value Vm2 is applied to the motor from when the current detection is performed at the certain current detection timing.

6. The motor drive device according to claim 1, wherein the corrected voltage value generation portion calculates the corrected voltage value Vo with the following equation:

$$Vo = \left(Vm1 \times \frac{T_2 - T_1/2}{T_1} + Vm2 \times \frac{3T_1/2 - T_2}{T_1}\right) \div 2$$

where Vm2 is the application voltage value generated by the application voltage generation unit from a certain current detection timing, Vm1 is the application voltage value generated by the application voltage generation unit and stored in the application voltage value storage portion from the current detection timing one before the timing, T1 is the current detection cycle in the current detection unit, and T2 is the time necessary until the voltage of the application voltage value Vm2 is applied to the motor from when the current detection is performed at the certain current detection timing.

* * * * *